United States Patent
Reardon et al.

(10) Patent No.: US 8,346,660 B2
(45) Date of Patent: *Jan. 1, 2013

(54) SYSTEM AND METHOD FOR TWO-WAY TRANSFER OF FUNDS AND ELECTRONIC CONTENT BETWEEN SUMMA ACCOUNT USERS WITH GATHERING OF BEHAVIORAL METRICS AND MANAGEMENT OF MULTIPLE CURRENCIES AND ESCROW ACCOUNTS

(75) Inventors: David C. Reardon, Dardenne Prairie, MO (US); Timothy L. Henson, Springfield, IL (US)

(73) Assignee: David C. Reardon, Dardenne Prairie, MO (US)

( * ) Notice: Subject to any disclaimer, the term of this patent is extended or adjusted under 35 U.S.C. 154(b) by 284 days.

This patent is subject to a terminal disclaimer.

(21) Appl. No.: 12/544,886

(22) Filed: Aug. 20, 2009

(65) Prior Publication Data

US 2009/0319368 A1    Dec. 24, 2009

Related U.S. Application Data

(63) Continuation-in-part of application No. 11/063,076, filed on Feb. 22, 2005, now Pat. No. 7,873,572.

(60) Provisional application No. 60/547,462, filed on Feb. 26, 2004, provisional application No. 61/090,829, filed on Aug. 21, 2008.

(51) Int. Cl.
*G06Q 40/00* (2012.01)

(52) U.S. Cl. ................ 705/39; 705/35; 705/40; 705/42

(58) Field of Classification Search .............. 705/35–45, 705/34, 14, 64, 65
See application file for complete search history.

(56) References Cited

U.S. PATENT DOCUMENTS

| | | | |
|---|---|---|---|
| 5,220,501 | A | 6/1993 | Lawlor et al. |
| 5,327,486 | A | 7/1994 | Wolff et al. |
| 5,329,589 | A | 7/1994 | Fraser et al. |
| 5,473,671 | A | 12/1995 | Partridge, III |
| 5,625,680 | A | 4/1997 | Foladare et al. |
| 5,742,668 | A | 4/1998 | Pepe et al. |
| 5,790,790 | A | 8/1998 | Smith et al. |

(Continued)

FOREIGN PATENT DOCUMENTS

JP    08-339407    12/1996

(Continued)

OTHER PUBLICATIONS

"Viking Systems, Inc. and Netnote International, Ltd. Sign Agreement for Use and Distribution of E-commerce Technologies", Business Editors, Business Wire, New York: Feb. 18, 1999, p. 1.*

(Continued)

*Primary Examiner* — Hai Tran
(74) *Attorney, Agent, or Firm* — Thompson Coburn LLP

(57) ABSTRACT

A method and system for creating a pre-defined electronic transactions is disclosed. the system comprises a server in communication with a database and a computer network, and the server is configured to: (1) receive a request to create a pre-defined electronic transaction from a client computer via the computer network, (2) receive input from the client computer comprising information that at least partially defines the pre-defined electronic transaction, and (3) store the received information in the database.

34 Claims, 8 Drawing Sheets

U.S. PATENT DOCUMENTS

| | | | |
|---|---|---|---|
| 5,826,241 | A | 10/1998 | Stein et al. |
| 5,828,737 | A | 10/1998 | Sawyer et al. |
| 5,835,087 | A | 11/1998 | Herz et al. |
| 5,960,411 | A | 9/1999 | Hartman et al. |
| 5,987,606 | A | 11/1999 | Cirasole et al. |
| 5,999,967 | A | 12/1999 | Sundsted |
| 6,005,870 | A | 12/1999 | Leung et al. |
| 6,023,723 | A | 2/2000 | McCormick et al. |
| 6,029,150 | A | 2/2000 | Kravitz |
| 6,047,272 | A | 4/2000 | Biliris et al. |
| 6,061,718 | A | 5/2000 | Nelson |
| 6,064,723 | A | 5/2000 | Cohn et al. |
| 6,073,167 | A | 6/2000 | Poulton et al. |
| 6,112,227 | A | 8/2000 | Heiner |
| 6,161,130 | A | 12/2000 | Horvitz et al. |
| 6,192,114 | B1 | 2/2001 | Council |
| 6,199,102 | B1 | 3/2001 | Cobb |
| 6,209,095 | B1 | 3/2001 | Anderson et al. |
| 6,233,584 | B1 | 5/2001 | Purcell |
| 6,240,408 | B1 | 5/2001 | Kaufman et al. |
| 6,246,996 | B1 | 6/2001 | Stein et al. |
| 6,253,198 | B1 | 6/2001 | Perkins et al. |
| 6,253,201 | B1 | 6/2001 | Abdel-Mottaleb et al. |
| 6,330,550 | B1 | 12/2001 | Brisebois et al. |
| 6,332,134 | B1 | 12/2001 | Foster |
| 6,393,464 | B1 | 5/2002 | Dieterman |
| 6,393,465 | B2 | 5/2002 | Leeds |
| 6,393,568 | B1 | 5/2002 | Ranger et al. |
| 6,408,284 | B1 | 6/2002 | Hilt et al. |
| 6,421,709 | B1 | 7/2002 | McCormick et al. |
| 6,438,584 | B1 | 8/2002 | Powers |
| 6,446,115 | B2 | 9/2002 | Powers |
| 6,453,327 | B1 | 9/2002 | Nielsen |
| 6,484,197 | B1 | 11/2002 | Donohue et al. |
| 6,493,007 | B1 | 12/2002 | Pang |
| 6,587,550 | B2 | 7/2003 | Council et al. |
| 6,618,160 | B1 | 9/2003 | Kato et al. |
| 6,654,787 | B1 | 11/2003 | Aronson et al. |
| 6,697,462 | B2 | 2/2004 | Raymond |
| 6,708,205 | B2 | 3/2004 | Sheldon et al. |
| 6,732,149 | B1 | 5/2004 | Kephart |
| 6,732,154 | B1 | 5/2004 | Poulton et al. |
| 6,868,498 | B1 | 3/2005 | Katsikas |
| 6,968,319 | B1 * | 11/2005 | Remington et al. ............ 705/40 |
| 7,003,306 | B2 | 2/2006 | Henry-Labordere et al. |
| 7,076,458 | B2 | 7/2006 | Lawlor et al. |
| 7,089,208 | B1 * | 8/2006 | Levchin et al. ............... 705/39 |
| 7,191,151 | B1 | 3/2007 | Nosek |
| 7,236,969 | B1 | 6/2007 | Skillen et al. |
| 7,249,060 | B2 | 7/2007 | Ling |
| 7,249,094 | B2 | 7/2007 | Levchin et al. |
| 7,257,246 | B1 | 8/2007 | Brodie et al. |
| 7,257,530 | B2 | 8/2007 | Yin |
| 7,269,160 | B1 | 9/2007 | Friedman et al. |
| 7,395,241 | B1 | 7/2008 | Cook et al. |
| 7,415,409 | B2 | 8/2008 | Simoneau et al. |
| 7,415,460 | B1 | 8/2008 | Phillips et al. |
| 7,430,537 | B2 | 9/2008 | Templeton et al. |
| 7,641,113 | B1 | 1/2010 | Alvarez et al. |
| 8,024,260 | B1 * | 9/2011 | Hogl et al. ............... 705/38 |
| 2002/0026396 | A1 * | 2/2002 | Dent et al. ............... 705/35 |
| 2002/0052855 | A1 | 5/2002 | Landesmann |
| 2002/0120582 | A1 | 8/2002 | Elston et al. |
| 2003/0009698 | A1 | 1/2003 | Lindeman et al. |
| 2003/0023736 | A1 | 1/2003 | Abkemeier |
| 2003/0080185 | A1 | 5/2003 | Werther |
| 2003/0182230 | A1 | 9/2003 | Pessin |
| 2003/0220779 | A1 | 11/2003 | Chen et al. |
| 2004/0165707 | A1 | 8/2004 | Raymond |
| 2005/0188045 | A1 | 8/2005 | Katsikas |
| 2005/0192078 | A1 | 9/2005 | Jawaharlal |
| 2005/0192893 | A1 * | 9/2005 | Keeling et al. ............... 705/39 |
| 2005/0192899 | A1 | 9/2005 | Reardon |
| 2006/0041505 | A1 | 2/2006 | Enyart |
| 2006/0213968 | A1 | 9/2006 | Guest et al. |
| 2006/0253389 | A1 | 11/2006 | Hagale et al. |
| 2007/0203836 | A1 | 8/2007 | Dodin |
| 2009/0119159 | A1 | 5/2009 | Reardon et al. |

FOREIGN PATENT DOCUMENTS

| | | |
|---|---|---|
| JP | 2002-041408 | 2/2002 |
| JP | 2003-157215 | 5/2003 |
| JP | 2004-013655 | 1/2004 |
| WO | 01053977 | 7/2001 |

OTHER PUBLICATIONS

Office Action for U.S. Appl. No. 11/063076 dated Jan. 7, 2009.
Office Action for U.S. Appl. No. 11/063076 dated Jun. 18, 2009.
Office Action for EP Application 05723603.6 dated Aug. 5, 2008, 5 pages.
Altoft, Patrick, SEO Blog—Internet Marketing News: Google Patents SMS Payment System, SEOptimise, Sep. 2, 2007, www.seoptimise.com/blog/2007/09/google-patents-sms-payment-system.html, 6 pages.
Bandar, Ehab, Google Patents Gpay for Paying on the Go, Banking Unwired, Sep. 3, 2007, www.bankingunwired.com/2007/09/03/google-patents-gpay-for-paying-on-the-go/, 6 pages.
Bray, Hiawatha, A chance to board the e-mail gravy train, The Boston Globe, Mar. 15, 2004, 2 pages.
Claburn, Thomas, The War on Spam Takes a Novel Turn, Information Week, May 17, 2005, 4 pages.
Guth, Robert, Microsoft to Launch Cashback Search Services, The Wall Street Journal Online, May 21, 2008, 1 page.
Internet Pionees Joins Vanquish, Yahoo! Finance, Jun. 16, 2004, 1 page, Yahoo! Inc.
Kille, Steve, Lemonade: Important Open Standard for Mobile Devices, Ferris Research, May 25, 2005, www.ferris.com/2005105/25/lemonade_import/, 1 page.
Malo, Jim, Money talks: Make spammers pay to send you e-mail, Mass High Tech, Feb. 2, 2004, 1 page.
Martin, Richard, Google Applies for 'GPay' Mobile Payments Patent, Information Week, Sep. 4, 2007, www.informationweek.com/news/mobility/showArticle.jhtml?articleID=201804016, 7 pages.
Obopay, date unknown, www.obopay.com/consumer/jsp/html/aim_info.html, 1 page.
Open Standards: The best approach for Mobile Messaging, Isode, May 22, 2005, www.isode.com/whitepapers/lemonade-open-standards.html, 4 pages.
Parker Wayne & Kent, Blackberry's Mobile Email Dominance Threatened by Lemonade Server, SourceWire, Oct. 3, 2006, www.sourcewire.com/releases/rel_display.php?relid=27424&hilite=, 4 pages.
Raymond, Philip, Pay for E-mail Crowd Missing the Point, ChickZFeatures, Feb. 17, 2004, 2 pages.
Raymond, Philip, Spam, Economics and Democracy, Jan. 25, 2005, 8 pages, V 3.0, Vanquish, Inc.
Raymond, Philip, What's New at Vanquish?, May 17, 2005, 3 pages.
Riley, Duncan, Could Gpay Be Google's Killer Phone App?, TechCrunch, Sep. 2, 2007, www.techcrunch.com/2007109/02could-gpay-be-googles-killer-phone-app/, 14 pages.
Shaffer, Scott P., Obopay, An M-Commerce Solution?, The Pondering Primate, Mar. 8, 2006, theponderingprimate.blogspot.com/2006/03/obopay-m-commerce-solution.html, 18 pages.
Third Party Submission in Published Application for U.S. Appl. No. 11/364,571 in the name of Ramy Dodin, filed Oct. 19, 2007 by Vern Maine & Associates, 11 pages.
Wetzel, Rebecca, Spam Fighting Business Models—Who Wins, Who Loses, Business Communications Review, Apr. 2004, pp. 24-29 (6 pages).
Wolverton, Troy, PayPal sued in patent dispute, CNET News, May 15, 2002, news.cnet.com/PayPal-sued-in-patent-dispute/2110-1017_3-914619.html.
Examination Report of European Patent Application No. 05723603.6-2221 dated Aug. 5, 2008.
Office Action for U.S. Appl. No. 11/063076 dated Dec. 22, 2009.

* cited by examiner

SYSTEM AND METHOD FOR TWO-WAY TRANSFER OF FUNDS AND ELECTRONIC CONTENT BETWEEN SUMMA ACCOUNT USERS WITH GATHERING OF BEHAVIORAL METRICS AND MANAGEMENT OF MULTIPLE CURRENCIES AND ESCROW ACCOUNTS

RELATED APPLICATION DATA

This application is a continuation in part of application Ser. No. 11/063,076, filed Feb. 22, 2005, currently pending, which claims the benefit of provisional application Ser. No. 60/547,462, filed Feb. 26, 2004, the disclosures of which are incorporated by reference herein. This application also claims the benefit of provisional patent application Ser. No. 61/090,829, filed Aug. 21, 2008, the disclosure of which is incorporated by reference herein.

BACKGROUND

The disclosure relates to electronic transactions that have a content part and a funds transaction part which is hereinafter defined in accordance with the term "Summa." The disclosure also relates to methods and systems for conducting electronic transactions between two parties having Summa accounts in which there is the transmission of a Summa message from one party acting as the sender and the other party acting as the receiver, wherein any user can be the sender or the receiver. This invention is related to embodiments of the Summa transactions directed toward micropayments, processing of message types, escrow accounts, and multiple currency and credit accounts.

The parent applications, the disclosures of which are incorporated by reference herein, discuss methods and systems for the two-way transfer of payments and messages between at least two users of electronic communication devices (ECD) in communication with a computer server system with which both users have access and using the server system to both transfer electronic messages and to credit and debit the users accounts as required and authorized by the users. These methods and systems feature the payment of a small amount to users of the electronic messaging device with the delivery of a commercial advertisement. As will become evident from the following discussion, micropayments may be incorporated into such a system and associated with the delivery of electronic messages/content via general purpose computer operating web browsers, or specialized software clients.

As discussed in the parent applications, the ability of the Summa transactions to facilitate two-way micropayments provides numerous benefits to Internet sites seeking to monetize their services. For example, websites containing user generated content, such as Facebook™, Wikipedia™, Flikr™, and YouTube™, are very popular and serve a large user base. In many cases, the providers of these services seek to monetize the value of their services by placing advertisements on the pages alongside the user generated content. In many cases, users have no control over the placement or content of any advertisements which may appear alongside their user generated content. As described below, electronic content such as web pages (which may include text, video, audio, programming, or any other electronic information) may be incorporated into the content part of a Summa message in a fashion that allows for collecting funds each time the content is uploaded by the user of a Summa enabled ECD. Conversely, users may receive a payment for activating a hyperlink to, for example, view an advertisement, to complete a survey, or to complete a paid task. Data collected from managing the transactions may be useful for better targeting of commercial messages and data analysis, managing different message types, and for managing store credits and multiple currencies, and managing the escrow of payments pending the delivery of physical goods.

In the specification, the below listing of terms have the following meaning:

"Electronic Communication Device" ("ECD") is any device with computing and communication functions which is capable of communicating with other electronic devices such as computers, cell phones, personal digital assistant ("PDA"), interactive television sets, or other such devices via wired or wireless transmissions, including the internet, Wi-Fi, Bluetooth, RFID, or similar existing or future services or protocols. Examples of ECDs include mobile devices as well as ECDs that are placed at fixed locations such as network server farms, cell phone towers, and other permanent or semi-permanent installations.

"Client" refers to an application or system which communicates via a network with a server network. In this specification, the client typically includes user's ECD running client software in network communication with the Summa Server Network Interface.

"Mobile Electronic Device" ("MED") is a mobile, usually hand held, electronic communication device equipped with the ability to communicate with other ECD via cell phone networks, the internet, Wi-Fi, Bluetooth, RFID, or similar existing or future services or protocols. This may be a cell phone, mobile phone, or personal digital assistant (PDA), but may also include electronic communication device mounted in a vehicle or a portable vendor's kiosk or other system which is intended to be transported from place to place with relative ease.

"Behavioral metrics" includes any data points that can be measured to track the behavior, response, location or other information about the user of an ECD.

"Receipt charge" is the charge set by the receiver of a Summa message (see definition below) to be applied against the account of a sender and credited to the account of a receiver as generally or specifically defined in the charge schedule. A receipt charge may be negative, which would indicate a payment from the receiver to the sender.

"Receiver" and "recipient" refer to the user of a Summa account (hereinafter defined) who receives a Summa message (hereinafter defined).

"Sender" refers to the user who sends a Summa message (hereinafter defined).

"Service provider" refers to an entity that provides Summa accounts (hereinafter defined) to a plurality of users through at least one Summa network server. Typically, the service provider may be a bank or other financial institution, an internet service provider, or another business offering or managing credits accessible to users through a Summa account (hereinafter defined).

"Summa message" refers to electronic information composed of two parts, an electronic content part (or "message part") and a funds transfer part. The content part, delivered to the user's ECD, would typically be text, video, audio, or other electronic content typical of electronic messaging provided by the sender, while the funds transfer part is a packet of information defining and authorizing a transfer of funds to be credited to or debited from the Summa associated financial account of the sender to or from the Summa associated financial account of the recipient of the Summa message, wherein the funds transfer is contingent on, co-dependent and/or concurrent to delivery of the content part. Delivery may also be contingent on other conditions set by either the sender or recipient, as described elsewhere.

"Summa" is an adjective modifying any portion of the Summa messaging and financial transaction system and in particular indicates that the associated noun which Summa modifies is related to a Summa transaction and/or the gathering and use of data associated with Summa transactions.

"Summa account" refers to an account assigned to a user by a Summa service provider which enables the user to engage in the two-way exchange of Summa messages, as either a sender or a receiver of Summa messages. Each Summa account consists of at least one electronically managed financial account and at least one integrated electronic messaging system. Or, conversely, each Summa account consists of at least one electronic messaging system that is integrated into the electronic management of one or more financial accounts. Alternatively, each Summa account may be composed of a two-way electronic messaging system hosted by the Summa service provider that includes the information, programming and authorizations necessary to credit or debit to one or more financial accounts.

"Summa enabled ECD" refers to any electronic device operating independently of the Summa Link servers which has the necessary programming to accept and/or send and/or display or deliver a Summa message through a computer network associated with the Summa Link servers.

"Summa hyperlink" refers to a code, generally hypertext markup language (HTML), which contains or is associated with information defining a Summa message, including both the funds transfer part and the electronic content part, that has been pre-defined by the creator/publisher of the hyperlink. Activation of a Summa hyperlink initiates the processing of the Summa transaction between the user activating the hyperlink and the creator/publisher. An error free Summa transaction will result in the delivery of the electronic content part of the Summa message associated with the Summa hyperlink concurrent with, and perhaps conditional upon, the transfer of the funds part associated with the Summa message, with the funds being transferred to or from the Summa account of the person activating the hyperlink and from or to the party designated by the Summa hyperlink, typically the creator/publisher and/or agents or clients of the publisher.

"Summa transaction" refers to an electronic transaction involving the processing a Summa message, including processing of both the content part and the funds transfer part and the exchange of information to users and servers regarding the transaction.

"User" refers to any person or business entity with a Summa account on the network. A user may be either the receiver or sender of a Summa message.

"User generated page" refers to any electronic content, including text, video, audio, or programming, which may be treated as the content part of a Summa message and is intended to be made available for retrieval by other users of a computer network.

DETAILED DESCRIPTION

Figure 1:
FIG. 1 illustrates an exemplary vendor set up page for defining a Summa hyperlink.

To summarize the disclosure, prior to sending or receiving a Summa transaction, each Summa user will have established a Summa account with a Summa service provider. This account must include either a deposit of funds or a line of credit associated with the Summa account and an electronic messaging system for sending and receiving the content part associated with a Summa transaction. The electronic messaging system may provide for the sending and receiving of Summa transactions and may comprise a two-way communications and financial transaction system, with each user account adapted to switch from a sending mode to a receiving mode. The two-way nature of the Summa system provides for users to alternately be a sender or a receiver of a Summa message to or from one or more other system users having Summa accounts. The Summa network and/or Summa server interface accepts, tracks, and delivers Summa messages while also balancing all financial accounts associated with each user's account and provides for the collection and dissemination of marketing data associated with Summa transactions.

In addition, a Summa message may define conditions under which a transaction will be accepted and delivered to the Summa account owner. For example, through a web browser or a dedicated Summa client, in anticipation of being a receiver of Summa message, a user may define a schedule of receipt charges that senders must pay to the receiver as compensation for accepting delivery of their Summa messages. Upon delivery of a Summa message, the sender's Summa account is debited the agreed upon charge(s) and the sender's account is credited the charge, minus any service fees that may be imposed by the service provider. Accordingly, the system and methods discussed below also provide a secure manner of transferring additional funds, other than the receipt charge, between any two Summa accounts. This facilitates internet purchases, micropayments, electronic invoicing and bill payment, and any other transfer of funds that user may require. Because this payment involves a transfer of funds directly between Summa accounts, there is no need to transmit credit card numbers or account numbers over the internet.

The Summa network may also accommodate the collection and dissemination of data regarding interactions of users with commercial messages and purchases made through the Summa network. This data may be stored in a database. Collecting and making this data available increases the value of each user's market identity and thereby increases the income that users will be able to receive from receipt charges. The electronic processing of Summa messages allows for (1) immediate processing of the funds associated with the message, (2) the ability to predicate the processing of funds on conditions related to successful delivery of the content part, and (3) the ability to manage a nearly infinite number of variations on the delivery charge. Delivery may be also be contingent on additional conditions set by eligible recipients of the Summa message, such as requiring a receipt charge to be paid by the sender. Other conditions may be set by the sender, requiring, for example, that the receipt charge must be less than a maximum amount authorized to be paid to the receiver by the sender. Additionally, the sender may set delivery criteria defining one or more user accounts eligible to receive or execute the Summa transaction. This restriction might limit access to the content to specific user account ID's or access may be limited to more general information, such as age, gender, or other qualifying criteria associated with Summa user's accounts.

Accordingly, the Summa network may be configured with, and adapted to process, hyperlinks defining a Summa transaction. In other words, a hyperlink may define a Summa message that includes both the funds transfer part and the electronic content part which must be processed to complete a Summa transaction. Activation of such a hyperlink (i.e., a "Summa hyperlink") by a Summa user will authorize payment to or from a user's Summa account concurrent with the delivery of the content part associated with the hyperlink to the user's ECD and with a concurrent debit or credit of funds to the Summa user posting the Summa hyperlink on his website to facilitate the payment and delivery of the goods or services being sold. Thus, the Summa hyperlink system and method allows a user to "instantly" pay for electronic content and to have the content immediately delivered to his ECD. Because this payment is mediated through the Summa network, it is more convenient than other payment methods in that it does not require the person to use a credit card or to create a user account for each web site. Moreover, while the payments made through a Summa hyperlink may be for any amount, these links may be most especially useful for micropayments of a few cents. For example, a user may activate a Summa link to pay a few cents to view a video, listen to a song, or to read premium content which is immediately delivered with the same action which confirms permission to make the payment. As many internet marketing methods employ the incentive of sharing income with persons who refer a buyer to their web site, this invention also provides an example of a way in which revenue sharing may be enabled in a Summa network.

Also, a Summa hyperlink may be configured to authorize payment to the Summa user activating the link proximate to the delivery of the associated content part. For example, an advertiser may pre-authorize a payment from the advertiser's Summa account to the Summa account of a user who activates a Summa hyperlink associated with a banner ad. In this case, the payment to the user activating the link would be made concurrently with the delivery of the electronic message (content) associated with the Summa transaction defined by the Summa hyperlink, or optionally, after additional conditions required by the advertiser were met, for example after the user had viewed the advertisement for at least twenty seconds.

Additional programming may be used to implement other "message types", or "content types," delivered through a Summa transaction. Different processing rules, both at the server side and the client side, may apply to various message types. A particularly useful message type would allow the content to be an address to a dynamically generated web page which would be delivered to the user as the content part of the Summa message. The ability to process and display a dynamic web page would have numerous advantages over the display of static messages which are currently required with SMTP email.

Also, Summa transactions via the Summa hyperlink may be monitored to collect data useful for creating a profile of interests, purchases, and activities of users so this data may be used to improve the targeting of commercial messages and to also increase the value of each person's "market identity." This market identity is a reflection of marketing information associated with an individual that is of value to marketers. Because the Summa network provides a means by which individual users may receive a micropayment from marketers every time they use the Summa network to contact a user, thereby increasing the value of the information collected, improving the targeting of messages, and increasing the amount that advertisers are willing to pay to more highly targeted prospects. In exchange for this payment, typically the marketer would receive the Summa account address of each user who view the ad, facilitating follow-up with interested prospects.

Although the terms "funds" or "money" transfer are used in this document, it is not intended that the terms be restricted to transfers involving cash or cash equivalents. Store credits, points or other representations of value may also be substituted or included under the identification of funds or money. Multiple currencies and store credits may be managed in association with a single Summa ID. Also, indirect transfers of funds or money may be perfected in the Summa network. Accordingly, Summa users have some flexibility and may use various payment schemes to match the payment or receipt methods preferred by particular users. For example, one user may choose to have an account directly with a central payment system, while another user may prefer to have an account with a third party, to which the central system (which would be part of the larger payment system that includes the third party) could transmit funds. The central payment system may itself have an account or other relationship with the third party for making such transfers.

Figure 2:
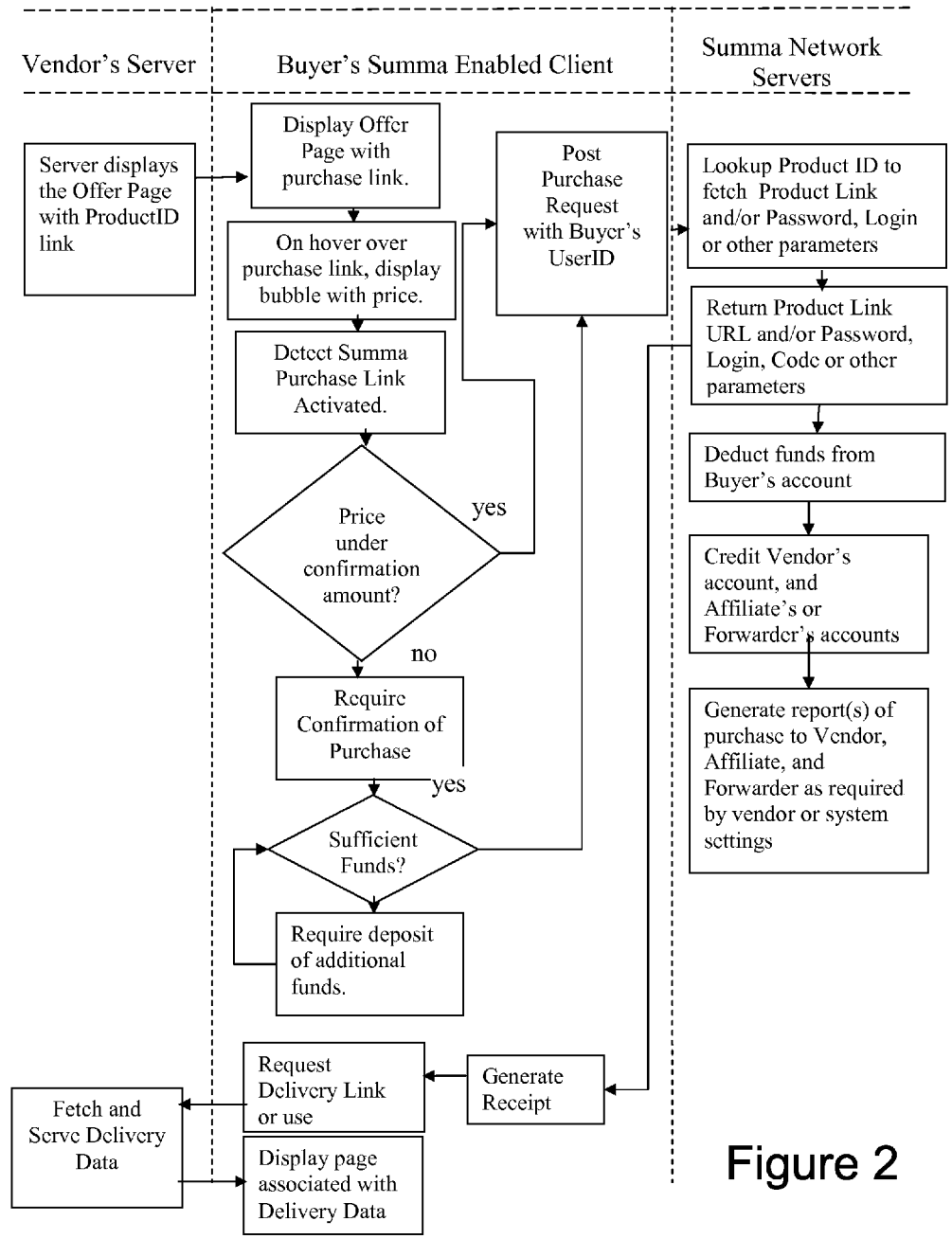
FIG. 2 shows a swim lane diagram illustrating a Summa enabled client system and the process of purchasing predetermined products in terms of the activities of the vendor's servers, the buyer's Summa enable client, and Summa network servers.

FIGS. 1 and 2 show a system where a vendor and a consumer have Summa network enabled accounts, thereby allowing for easier and more rapid delivery of goods and services. As shown in FIG. 1, a vendor may place a summa purchase hyperlink in a web page or software application that upon activation by a Summa user would provide the information necessary to (1) verify that the Summa user has a funded Summa account, (2) verify the Summa user's permission to make the purchase of the vendor's product from the Summa account, (3) record the purchase and transfer of funds, and (4) deliver a receipt for the purchase and/or the purchased electronic content to the buyer. An embodiment of the vendor setup of the product offering is shown in FIG. 1 and the process flow for completing the sale and delivery is shown in FIG. 2. The link on the sales page might be in the form of a hyper-text transfer protocol (HTTP) link coded as:

http://purchase.summa.com&vendorID=2201&productID=a01&price=199

Using any ECD, a Summa user may activate this link to trigger an appropriate response from the Summa Network's purchase handling module at the subdomain name located at www.purchase.summa.com. If the user's client browser was not Summa enabled, the user's browser may be directed to a web page for logging into his Summa account via a web application or an alternative Summa enabled client. If the user's client was already Summa enabled and the user had previously logged into his or her account, the payment and delivery may be proceed immediately upon activation of this purchase link.

When setting up the system, the vendor and product would be identified in the Summa Network Purchase Module. For instance, a vendor may be provided with a web based form such as that illustrated in FIG. 1. Information from this form may be stored in a Products database in the Summa Network. Not all of the information shown in FIG. 1 is needed and an abbreviated version of the form may be used. For example, the system may be configured so that a vendor may choose to pay a commission to an affiliate marketer who brought a customer to the vendor's product. Optionally, the system may be configured so that a commission may be paid to the account of any Summa user who forwarded an advertisement for the product to a friend who ultimately purchased the product. The optional Offer Page Link may be used if a vendor's product offerings must be approved by the Summa service provider. Using this link, the service provider may verify what the offering was, the accuracy of the product payment link, et cetera.

Of these vendor variables, four specifically allow the system to function efficiently. The first relates to the vendor's Summa account ID to which funds will be deposited when a sale is made and to which the vendor's products are associated. The second relates to the price of the product. The third relates to at least one product ID for reporting purposes. The fourth defines the electronic information that the Summa network delivers to the buyer's client in response to activation of the purchase link.

The first three variables are shown in the example purchase link below:

http://purchase.summa.com&vendorID=2201&productID=a01&price=199

While a price is included in the link, the price information may also be associated with the vendor's product ID and other information stored in the database. Including the price in the web page link allows the user to learn the price of the product, as the user's browser may display the price when the user hovers over the link. In addition, providing the pricing information in the link allows the price information to be passed directly to the Purchase Module to allow the Purchase Module to confirm that the displayed price matches the price in the Products data base and accordingly the correct charges to be applied or credited, as applicable.

The fourth variable, which may be referred to as the "Delivery Data field", defines or references the electronic content associated with the Summa transaction that the Summa network delivers to the buyer's client in response to activation of the purchase link. For example, this data may comprise a receipt in the form of one or more electronic messages. Similarly electronic content pointed to by the "Delivery Data Field" may be web page addresses, codes, cookies, streaming video, attachments, emails or any other electronic information. In a simple format, the Delivery Data field may define an automated emailed receipt confirming that the ordered goods will be delivered to the buyer's home address. For instance, if the configuration of the buyer's client allows transmission of the home address, and the vendor's sale requires the home address, this address would automatically delivered to the vendor from records associated with the buyer's Summa account. In another example, if the product purchased is electronic content, the Delivery Data field may be a link to a web page or it may define an email that will be generated with system available variables and vendor supplied content such that the email would contain the electronic information being purchased either in the body of the message, as an attachment (i.e., an "ebook" or audio/video feed), a telephonic voice or text message, or any other desired form of electronic communication. As shown in FIG. 1, the Delivery Data field may be a link to a password protected web page. As seen in FIG. 1, the system is configured so that the vendor has an Access ID and password. The field "Report With URL Form Post" of FIG. 1 is an optional web address for posting information about the sale to the vendor with variables such as the UserID and user's name to be inserted into the post in whatever position is indicated by the vendor when the form is completed.

FIG. 2 shows a swim lane diagram illustrating the offer, purchase, and delivery process of a predetermined product in terms of the activities of the vendor's servers, the buyer's client, and the Summa Network servers. Upon confirmation of the purchase, the Summa Network Purchase Module passes the link associated with the Delivery Data field, the vendor Access ID, and vendor password back to the user's Summa enabled browser/client. To eliminate an unintended action producing a purchase and charge to a user, the system may be configured to require a second action (such as a second mouse click) confirming the purchase. The second click might be required in a popup box with a message such as "Please confirm your desire to purchase the Roadrunner Catcher's Manual for $1.99 by pressing the confirm button below." As this process might be cumbersome in some cases, for example, in the case of a pay-per-page-view newspaper web site where each new page costs only five cents, the system be configured to allow the user to select a disabling option to eliminate the popup box, for instance, an option to not ask for a confirmation if the price charged under a certain confirmation threshold (i.e., $0.20). If a popup box disabling option were activated, a single mouse click may be used to confirm the buyer's intent to complete the purchase, the payment, and the delivery of the desired web page. Alternatively, for a payment over a certain threshold, the system may be configured to force the user to confirm the purchase with a second click and also enter a confirming password. The password might also serve to act as an electronic signature. When the recipient's required amounts are small payments or "micropayments" in an amount below the user's specified or warning threshold, and/or when the user is logged into his Summa account, the system may be configured to allow the user to navigate through a series of micropayments with a single click for each link/payment.

Figure 3:
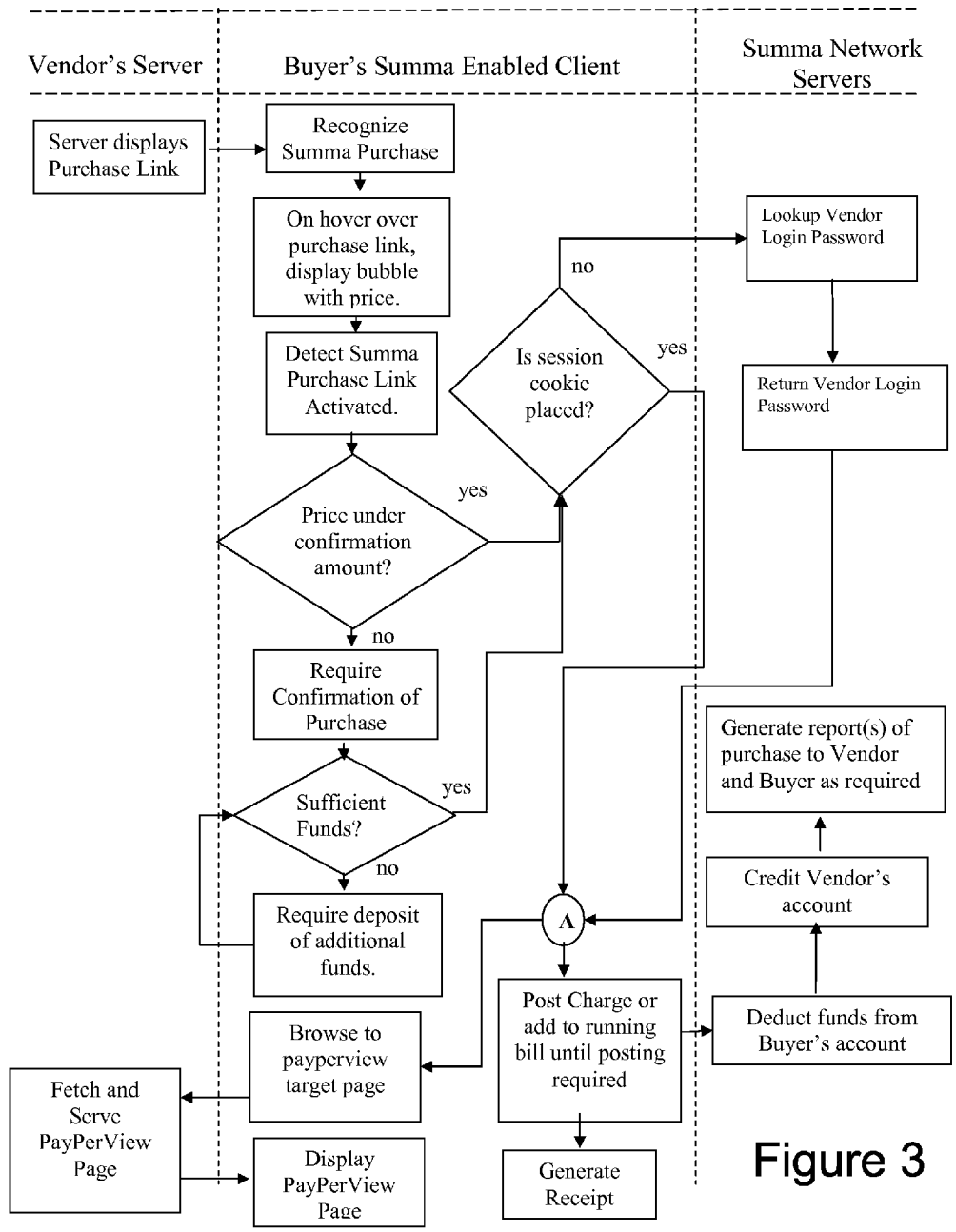
FIG. 3 shows a swim lane diagram illustrating a Summa enabled client system and the process of purchasing electronic content with accumulating total charges in terms of the interactions between a vendor's server, a buyer's Summa enabled client and Summa network servers.

FIG. 3 shows a swim lane diagram illustrating a Summa enabled client system and the process of purchasing electronic content with accumulating total charges in terms of the interactions between a vendor's server, a buyer's Summa enabled client and Summa network servers. In some applications, content on web pages changes often, for example, a news oriented website. Often these website have hyperlinks that change often. In such an application, the desired content web page address would itself be embedded in the Summa purchase link rather than associating the Product ID and the Respond to Purchase information on the Summa Network. For example, the hyperlink may take the following form:

http://payperview.summa.com&price=05&payperview=http://newspaper.com/01202010/a134.htm The information embedded in the link includes pricing information (i.e., $0.05) and the page to be viewed on confirmation of payment is http://newspaper.com/01202010/a134.htm. A browser is directed by the Summa domain address located at (http://payperview.summa.com) to a page where the user can login to his or her Summa account and open a Summa enabled client or browser window. From a Summa enabled client or browser, the same link is recognized to be a payperview link and with known information about the target page. The client then determines if sufficient funds are available and whether a confirmation click is required. If the funds are adequate, the client can either immediately browse to the selected page, or if a password or other security is in place, fetch the password or other authorization from the Summa Network. The system may be configured such that the password is associated with the vendor's website or a folder in the vendor's website. The system may be further configured so that the password need only be fetched once and would be reusable. The system may be further configured to cause a session cookie to be placed on the buyer's ECD so that additional pay per view pages could be viewed without the client being required to fetch a password or other delivery information from the Summa Network each time. To minimize Summa Network server requests, the Summa client may be configured to keep a running total of the charges that will be applied against the buyer's account at the end of the session, or after a certain number of minutes, or after the total reaches a set "posting" amount, such as $0.50, for instance, if the micropayment is very small (i.e., $0.05 or less). This may reduce bandwidth and processing time for the Summa Network servers and circumstances preventing the completion of the transaction within the specified criteria, for instance, due to the buyer's ECD having a power failure which prevented completion of the accumulated transaction, would be negligible.

Figure 4:
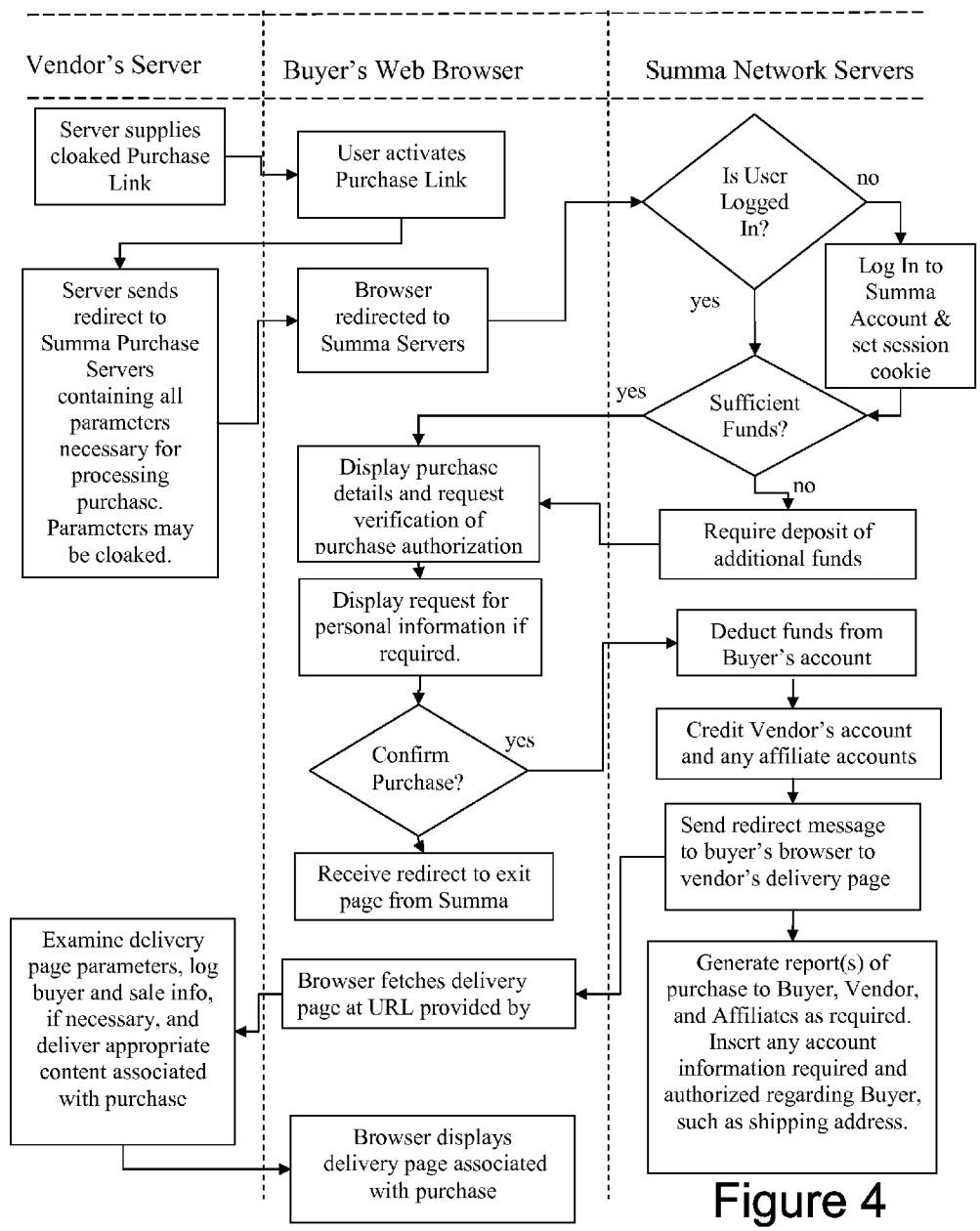
FIG. 4 shows a swim lane diagram illustrating a typical internet browser system and the process of purchasing predetermined products from a dynamically generated purchase link in terms of the interactions between a buyer's web browser, the vendor's server and Summa network servers.

FIG. 4 is a swim lane diagram illustrating the interactions between a Summa user's browser, the Summa network, and a content provider using Summa network dynamic content payment and delivery links. For the purposes of illustrating the functionality of such a system as schematically shown in FIG. 4, and not in any limiting sense, an exemplary user created video sharing website called FairTV will be described. In this example, FairTV acts as the vendor of content and supplies the vendor servers which serve as an interface between content providers, content viewers, and the Summa payment module. In this example, FairTV uses the Summa payment module to coordinate a split of pay-per-view micropayments between the content providers and FairTV with transaction fees collected by the Summa network. In the case of a user (for the purposes of this example "User A") contributing content to web pages hosted by FairTV, the system may be configured to allow User A to: (1) upload a video, (2) set a charge to be paid by viewers of the video, and (3) associate User A's Summa account with the video so User A can receive payments when the video is viewed. FairTV would then employ an automated process to convert the first 20 seconds, for example, of the video into a free sample and then post this on a page with a Summa purchase hyperlink which would allow the viewer to immediately pay to access the rest of the video.

Also, in this example, data such as that exemplified in FIG. 1 could be posted to the Summa Product database using an automated process. An automated process allows a vendor with a large number of products to upload pricing information and content associated with a large number of products. The process shown in FIG. 4, allows a vendor with a large number to automate the process of uploading pricing information and content associated with a large number of products in a dynamic content environment. For example, the user activated hyperlink may include, or a dynamic web page may generate, parameters passed to the Summa payment module, including all the information necessary to complete the Summa transaction. An example of such a link is shown below:

http://purchase.summa.com?vendorID=FTV&productID=a31&price=19&cont=Tom3&contp=40&deliv=http://fairtv.com/tom/a31.htm?secretw=(sw)&buyer=(userid).

Continuing further with the FairTV example, the parameters associated with the above link identify the following: (a) the vendor ID (i.e., "FTV"; this is also FairTV's Summa ID which will be credited with a portion of the sale price); (b) the vendor's product ID for the video (i.e., "a31"); (c) the price to be charged for viewing the video (i.e., "$0.19"); (d) the Summa ID of the user who created and contributed the video (i.e., "Tom3"); (e) the percent of the sale to be credited to the contributor, (i.e., "40%"); and (f) additional pricing information including the web price (i.e., "$0.19"), and the contributor's percentage of the sale (i.e., "40%"); and (g) the web page to which the buyer should be directed after the payment process is confirmed (this corresponds to the Delivery Data field in FIG. 1). Additional fields useful for processing of the transaction may also be provided in the link, and include fields for: (i) recording or reporting the transaction to the buyer, vendor, and the contributor or an affiliate that is to receive a share of the transaction, and/or (ii) transmitting or gathering marketing information. In the above example, the Delivery Data is included in the URL string http://fairtv.com/tom3/a31.htm?secretw=(sw)&buyer=(userid). The string illustrates a method of configuring the system to provide the ability of the vendor to instruct the Summa server to pass back information that is not provided in the purchase link. In this example, the two variable place holding fields (sw) and (userid) may be configured to be replaced by the Summa server with information useful to the vendor's processing and record keeping. In this example, the variable (sw) may represent a secret word parameter where the secret word has been previously provided by the vendor and is stored in the vendor's account information on the Summa server. The purpose of the secret word would be to help protect the purchase link from being useable for unauthorized access to the content because the information viewable in the purchase link would not contain the secret word. If an attempt was made to use the link without the secret word, the vendor's content server would decline to provide the content. Similarly, a vendor may use the "buyer=(userid)" string to require the Summa Server to include in the Delivery Data string the actual Summa User ID of the buyer in place of "(userid)." This may allow the vendor to record the buyer's UserID in the vendor's sales records. Any number other variables and parameters could be passed back to the vendor after the sale in order to control access to the content or to gather marketing information. As another example, the Delivery Data portion of the link may have the form http://fairtv.com/tom3/a31.htm?&code=onetimecode. In this example, the string following "code=" may comprise a unique code generated each time a purchase link is processed on the vendor's website. The system may be configured so that the unique code is stored in the vendor's database and associated with a purchase order code or other information tracking when and how the purchase link was activated. Thus, after the payment is processed, the system may be configured such that the Summa server directs the buyer's browser to a web page located at http://fairtv.com/tom3/a31.htm?&code=onetimecode. The system may be further configured such that the vendor's server looks up the unique code, marks the transaction as paid and delivered. Thus, if the same link were used a second time, the system may be configured to decline providing the content and instead display a message indicating that the link had already been used and a new purchase authorization is required access the link. In this mode, the system is configured to provide a layer of security, for instance, if a buyer tried to capture the link for reuse or transfer, the link would not work a second time. In these examples, the content and variables of the sample link are shown in a form that is relatively human readable. However, one may also use various encoding techniques to obscure the information being passed between the servers.

In another embodiment, the system may be configured such that the vendor's offering may include a more complex program script or program control embedded in the page or application which is activated by the user's click on the purchase/payment button. The vendor's purchase control software might, for example, be embedded in an electronic invoice with the invoice amount, account number, and any other information or options embedded with it. The recipient of the invoice would then only need to click on the "pay invoice" link or button to confirm the payment. The vendor's purchase control software may also include an embedded game or music player to create a virtual nickel-arcade which would debit the user's Summa account each time a game or song is played. The vendor's purchase control software may also comprise embedded hyperlinks that require Summa users accessing a third party service to pay a fee (for example, $0.01) in order to leave comments, edit a post, blog, or otherwise participate in a forum or online community hosted on a third party server network. By imposing a small fee on every post or alteration, a third party hosting service, such as MySpace™, Flickr™, and/or Wikipedia™, would have another way to monetize the value of their services. Additionally, configuring the system to require a user who posts comments to pay a fee associated with their Summa address also provides a mechanism to deter and track down abusive, indecent, or illegal postings. While the system may be configured to allow a user to contribute material under a pseudonym, the Summa server network may be configured to track a Summa address associated with each payment resulting from the activation of a link and/or the recipient control. Thus, if a posting violated a website's rules in a fashion that also violated Summa rules (for example, posting of copyrighted materials on the web site), the system would enable third party network owners to provide notice of the violation to the provider of the Summa network service.

As illustrated in the embodiments described above, the Summa account configuration provides many methods of utilizing a hyperlink or human activated "button" to initiate and complete a purchase. As discussed above, the user activating the link is authorizing a payment to be made from his Summa account. Because the Summa network configuration supports two-way Summa transactions, which can be used for two-way payments and two-way communications, web links may also be constructed to make a payment to the user who activates the link. This feature may be useful as a means of rewarding a user for engaging in some activity, such as reading an advertisement, completing a survey, electronically signing for and collecting a payment due, or many other activities which may involve the making of a payment and/or delivering electronic content to the user activating the hyperlink.

Figure 5:
FIG. 5 illustrates an exemplary a network set-up page for delivery payments to a viewer of an advertisement.
Figure 6:
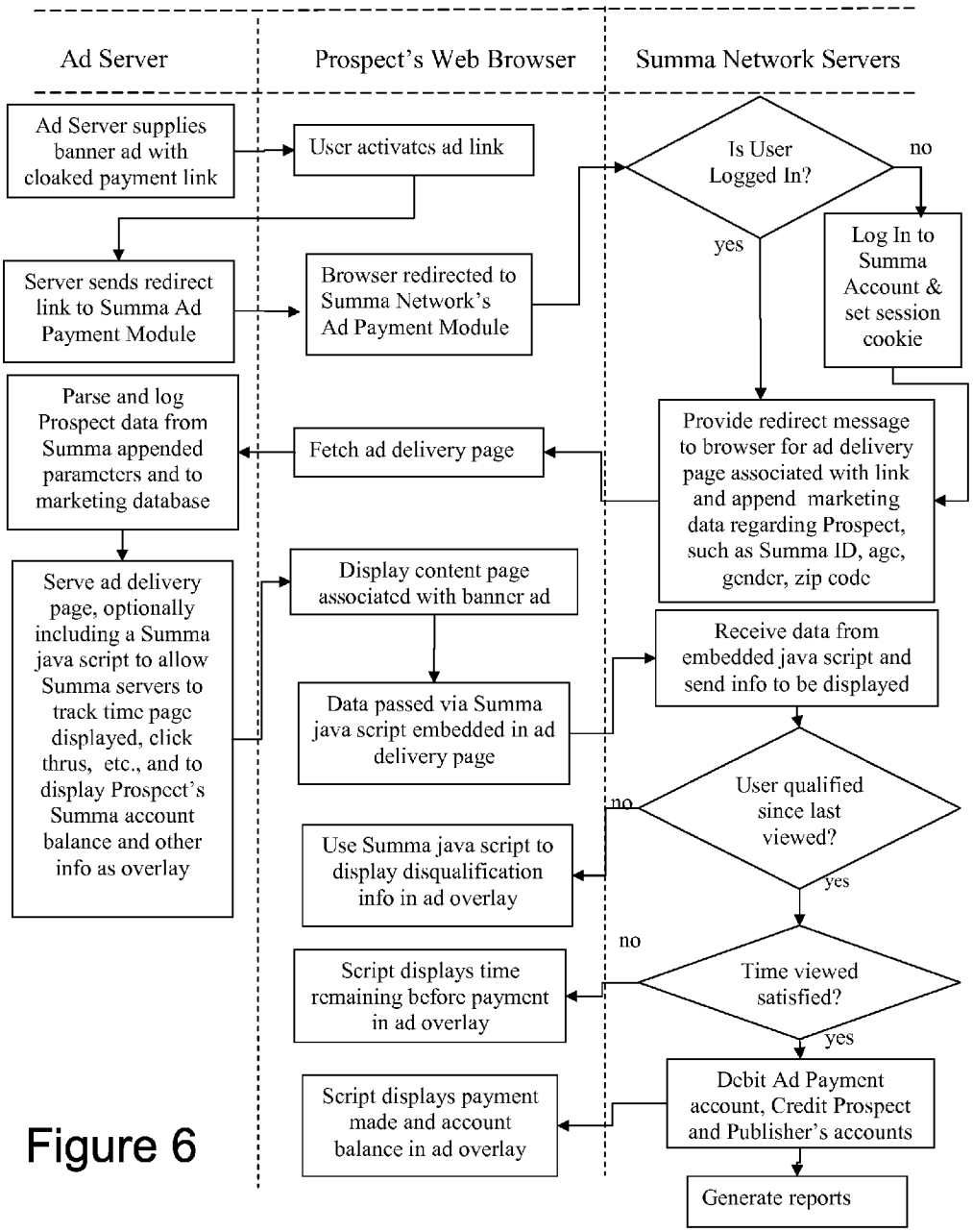
FIG. 6 shows a swim lane diagram illustrating the process for an advertiser to delivery payments to a viewer of an advertisement in terms of an advertising server, a prospects web browser, and the Summa network servers.

FIGS. 5 and 6 illustrate an exemplary process for implementing this technique in the context of a display of a banner advertisement configured to reward a user, who a clicks on the banner for more information, with a micropayment to the user's Summa account. FIG. 5 illustrates a table of values that would be completed by the agent authorizing payments made to viewers of the advertisement. The values may be stored in a Summa network data base. The table values may be completed manually or through a secure and/or automated process. While any number of variables could be created to control the handling of the process, the variables may include a payor ID specifying the account to be debited for payment to the viewer, an amount authorized to be paid, and a specification of the delivery data, which would typically be a web address identifying the page to which the viewer should be sent once he or she activates the banner advertisement associated with the payment. A unique ID ("Ad ID") may be associated with each advertisement to simplify the accessing of the parameters associated with the advertisement and payment. An additional variable may include a control qualification for receiving the payment. For example, to prevent click abuse, the system may be configured to enable an advertiser to set a "days between payments" parameter, which would allow only one payment to a Summa user account for the number of days specified. If the user clicked on the advertisement a second time within the specified time period, the user would be delivered to the associated advertisement page but would not receive a second payment. Similarly, the system may be configured to enable an advertiser to set a "number of viewing seconds required" parameter, which would require the viewer to stay on the delivery data page a required number of seconds before releasing the payment. The system may be configured to provide a countdown timer through embedded code associated with the web page. As with the purchase and delivery link previously described (see e.g., FIGS. 1 and 2), the system may be configured to provide feedback data to the advertising network, the publisher, or other parties, by posting data to their servers or by adding additional parameters to the Delivery Data link. In the example shown in FIG. 5, the link may be configured to pass back the UserID of the viewer being paid, gender, age or zip code or the IP address of the page on which the banner ad was displayed. The link may also be configured to track sales and commissions due, for instance, by including information for the advertising network identifying the affiliate advertiser, who may be paying for placement of the advertising in exchange for a commission on sales made FIG. 6 is a swim lane diagram illustrating additional detail of the process of an advertiser paying a user for viewing an advertisement. In this example, the system may be configured to generate an Ad Payment Link that would be associated with the banner advertisement. For instance, the link associated with the banner ad may be configured as a cloaked link or in the form http://payout.summa.com&adID=b023T4a. Thus, when activated, the Ad Server may be configured to redirect the user's browser to the Summa Network, provide the Ad ID with the information referenced in FIG. 5, and process the transaction accordingly. As shown in FIG. 6, the system may also be configured to determine if the user is already logged into the Summa network. If not, the system may be configured to prompt the user to login or to direct the user to the Delivery Data page without any payment so as to minimize disruption of browsing. If the user was logged in, the Summa network may be configured to determine if the user is qualified to receive a payment, for instance, by evaluating variables such as those measuring whether the user was previously paid for viewing the advertisement within a specified period. If the system determines that the user is qualified, the system may be configured to direct the user's browser to the Delivery Data Page and complete the transfer of funds to the viewer's account. FIG. 6 shows a configuration of the system with additional steps that include configuring the Delivery data link with additional parameters, for instance, enabling the ad server to capture the UserID, zip code, gender, affiliate ID, and IP address of the publisher where the banner ad was displayed. The system may be configured to track this data and direct the user's browser to a content page associated with the banner ad to which an advertiser wishes to drive traffic. The content page may include code, such as java script, or a Summa network tracking pixel, facilitating the ability of the Summa network to gather and/or display information on the content page. For example, if the system determines that a user was not qualified for having previously been paid to read an advertisement, the Summa network might use an embedded java script to momentarily display a notice such as "You were previously paid 5 cents to read this ad." If the system determines that a user is qualified to receive payment, the Summa network might use an embedded java script to display a brief notice stating, "You have just received 5 cents as a thank you for your time!" If the system is configured with other options, such as requiring a viewer to see the ad for a certain number of seconds, or to scroll to the bottom, to print the page, or otherwise interact with the ad, the embedded code would interact with the Summa network to collect any required data and to provide the appropriate feedback to the user. Though not shown, advertisers might be allowed to set additional conditions on release of the Summa message to only those users who fit certain other criteria, for example fitting within an age range or group of zip codes.

Generally speaking, messages and content conveyed via the Summa system may be individually associated with a specific message type which identifies to the Summa servers, or the appropriate applications running on the ECD, how the message should be processed or displayed. The message type may be identified in a header or other data string associated with the message at one and/or more stages of processing. For example, a message content may comprise an invoice having information typically required for an invoice, such as item numbers, item descriptions, quantity, per piece charge, and total charges. The message type may have header information such that upon recognizing the message type, an ECD may be configured to automatically capture the required information from the invoice and pass it into the receiver's accounting software generating an entry of the invoice and notice of when the payment is due. Another message type may have header information to allow the sender, most probably an advertiser, to authorize the transfer of a second fee which is paid only after the message is opened and read as determined by the number of seconds the message is read, by scroll bar activity, or by requiring the click through to a link (i.e., "show me more"). This second fee may be an extra payment or a portion or even all of the delivery charge. In the latter case, the Summa payment associated with the delivery fee would be paid only after the recipient had opened the message for a minimum period of time or had completed some other specific action required to claim the fee. If a secondary fee is available, the system may be configured to generate an icon, headline, or other indication, to be displayed to the recipient indicating the nature of the additional action required to obtain the additional payment. A combination of the above or similar techniques provides advertisers with additional tools to track the effectiveness of the advertisement and the payments made. Another message type may be a "Must Read" type message requiring the user to view the message for a minimum number of seconds, scroll through the entire message, or to affix an electronic signature acknowledging that the message had been read. Examples of these types of messages include messages announcing system-wide notifications, outages, emergency notifications, or a message comprising a legal documents or legal process. Other message types may not allow a delivery fee to be charged for delivery. Thus, the "no fee" type message may have heading information that allows the message to be delivered in a manner that bypasses the accounting modules of the Summa servers. However, the "no fee" type message may have header information enabling system tracking functions, for example to verify delivery of a message. A "no fee" message types may be used for delivery of receipts after a purchase as it is reasonable that a receipt may be delivered free of charge, although the summa server may be configured to charge the recipient for the convenience of receiving an electronic receipt that is automatically imported into the recipient's accounting software. Another message type may convey information along the lines of "Return Payment Expected," for instance, as may be used in connection with the delivery of a subscription based message. In this case, the system may be configured so that receiver is expected or required to preauthorize payment upon receipt of the message. If the payment is preauthorized, the system may be configured so that the recipient's ECD automatically generates and transmits a Summa message with the required payment upon receipt of the message from a particular sender. At any time, the recipient may then cancel his subscription simply by withdrawing authorization for auto-payment. Alternatively, the system may be configured so that the "Return Payment Expected" message type requires the ECD to hold the message in an encrypted form until the user manually approves a Summa payment to the sender. Upon authorizing the payment, the system may be configured so that the ECD decrypts the message and displays it to the recipient. With such a message type, the sender may be allowed to define additional rules governing how the Summa Network or the recipient's ECD may process the message if the payment is not preauthorized or made as required. For instance, the system may be configured to delete the message without notification to the recipient and to return a system message to the sender identifying the recipient as "unsubscribed." Alternatively, the system may be configured so that the sender chooses to allow the message to be displayed but requires that it be displayed with an additional message warning the recipient that the subscription will be canceled if payment is not made and/or preauthorized in the future. Another message type may convey information along the line of "Witness and Archive" and would generally instruct the Summa users to archive a message comprised of electronic files in a user's own personal archive maintained by a Summa associated server network. A Summa user may utilize this message type for the storage of valuable electronic documents, and the system may be configured to allow others to store and/or access electronic files of the user. The system may be configured to generate and maintain an access log recording access to the archive by the user and/or authorized third parties. The system may be configured to allow users to instruct the Summa associated server network to retrieve a copy of a specified file in the archive and to deliver it to third party. The system may be configured to deliver a notarized certificate of authenticity from archive provider or Summa associate server network verifying that the copy of the message and/or file comprises a true, complete, and authenticate copy of the message previously archived.

Another message type is one which uses the content portion of the Summa email to "push" a web link. For instance, the Summa content part of the email may be a reference to a web page which is actively fetched by the Summa client whenever the user views the message. To assist in explaining the functionality of a system so configured, the example below describes a system with a Summa client that includes a web browser portion used to display received content. This can be implemented in a web based Summa mail reading application, in a standard browser with a Summa plug-in adding additional functionality and control, or in an application specific "thick client" which runs on the user's ECD. For this example, the content portion of the Summa transaction would include a code instructing the Summa client to fetch the desired web page which should be displayed with or in place of the content part itself. For purposes of illustration and not in any limiting sense, the content part of a Summa message may be an HTML comment string of the form:

```
<!--SUMMAMESSAGETYPE:WEBPAGE-->
<!--SUMMASOURCE:http://www.vendor2/
offer1.html&userID&password-->
```

In this case, the Summa enabled client includes program code to recognize that this message type requires that instead of displaying this content, it should instead retrieve and display the identified source address http://www.vendor2/offer1.html while also passing through the userID and password that the vendor has provided to track or authenticate the recipient. Thus, the received content and the web page, are displayed in a browser frame. If allowed by the client, the system may be configured to allow the user to click on any hyperlinks in the frame and browse immediately to them while remaining in the frame. For example, if the Summa email message is the first page of a survey, the user may answer the questions, hit submit and be immediately shown the second page of the survey without changing windows. If the content/web page delivered is an invoice, clicking on the pay button can bring the user to the next page in the payment process, without changing windows. In other words, the content part of the Summa email message comprises a single message that links to a series of web pages, all within the same viewing window. This configuration allows a business and/or advertiser to update a webpage after the message has been sent and delivered. For example, if the message was sent on Monday announcing a 40% off sale, but the sale is then changed to 50% off Wednesday, a recipient who waits to read the message on Wednesday will see the latest, updated information regarding the 50% off sale. The Summa client may be configured to retain in the message database a copy of either (1) the code identifying the page to fetch in which case the code will fetch the designated page whenever the message is reselected or (2) a copy of the web page as it was when it was first read, thereby keeping a record of what the message was when it was first read. The system may be configured to allow the sender, recipient, or the Summa network provider to choose the mode.

Information regarding how a user reacts to a marketing message may be valuable to a marketer, and the system may be configured to collect this information on behalf of each Summa user. In most cases, the ECD used to access Summa messages has programmable computing functions. In order to enhance the collection of marketing data, the programming which allows the user to read, view, or listen may be configured to include program steps which track how the user reacts to the message and to convey this information back to the Summa network for storage in the marketing data module associated with the user's profile. This information may then be accessed later to more accurately identify prospective recipients for a marketing message. By way of example, the message reading software (client) on the ECD may be configured to track, in the case of a text or HTML message, how many times a message was read, how long it was read each time and/or cumulatively, whether the recipient scrolled part way or all the way through the message, whether any portion of the message (such as a coupon) was printed, whether any of the hyperlinks embedded in the message were activated, date deleted, or any other similar attributes. Similarly, with audio or video messages, the client may be configured to track whether the recipient listened to or viewed the entire message, how many times, or skipped through it. Forwarding of a message to a third party may also be tracked. These collected bits of data comprise "behavioral metrics" which can be used to better predict a user's response to similar messages.

To illustrate a configuration of the system in which behavioral metrics are gathered, consider a hypothetical scenario in which an advertiser is testing an offer for an investment newsletter which is sent to 10,000 recipients selected from the Summa user database on the basis of age and income alone. After delivery of an initial offer, the advertiser may have sold 50 subscriptions. However, in the course of the initial offer, behavioral metrics were gathered on all 10,000 recipients of the message. The advertiser may then select to send a follow-up offer to the 2,000 users who spent the most time reading the offer, even though those users did not subscribe after the initial offering. Because these 2,000 users are more likely to be interested than the 8,000 who spent the least time reading the offer, advertiser may have more success with a follow-up offer. A different newsletter publisher may also access the same behavioral metrics and select a list of Summa users who have expressed an interest in investment newsletters by either clicking on links in investment newsletter offers, printing out such offers, or having read such offers multiple times. The gathered behavioral metrics may be stored in a marketing database associated with the Summa network to allow marketers to more carefully target offers to those users who are most likely to be interested in their products and services.

Figure 7:
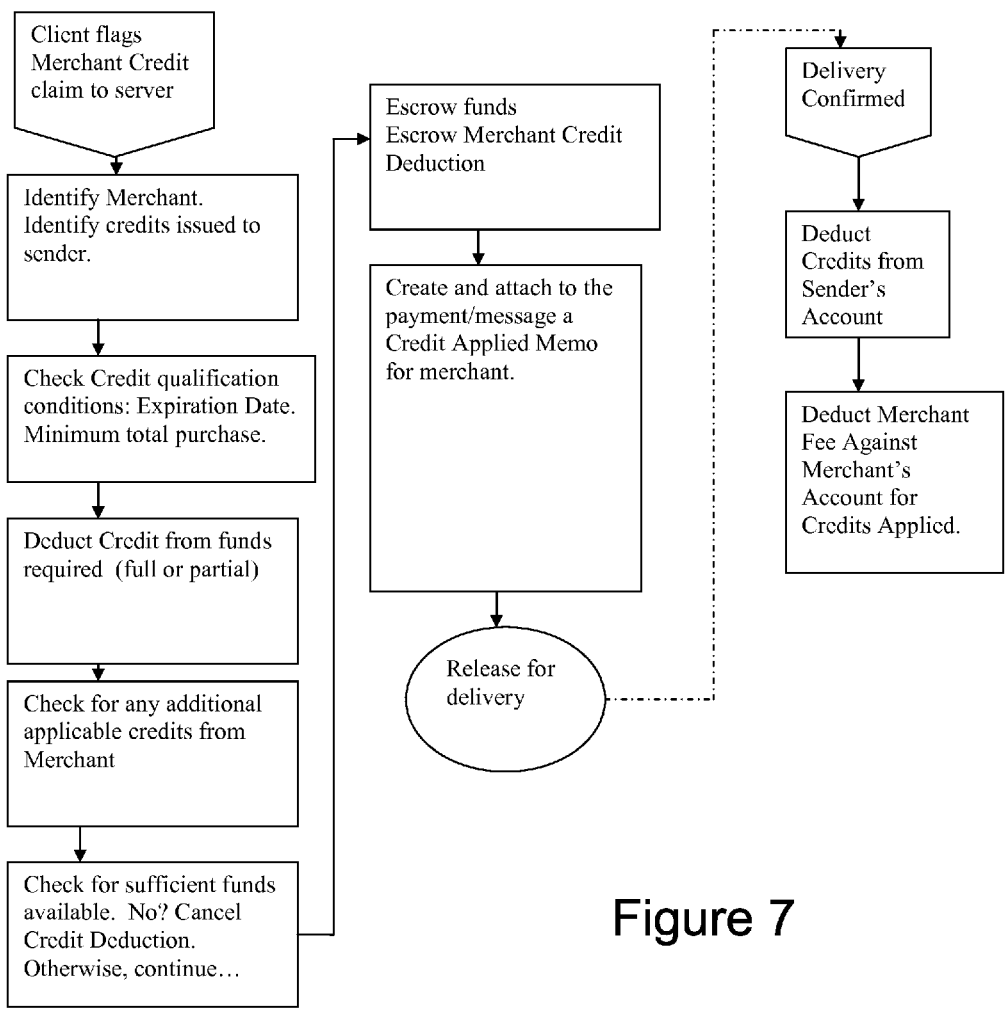
FIG. 7 is a flow chart illustrating an exemplary process for processing a merchant credit.

As shown in FIG. 7, the Summa server network may also be configured to issue or apply store credits against a payment. These functions may be integrated into a Credit Exchange Module which would (1) transfer funds after deducting any merchant credits which may have been issued to the user, and (2) convert the funds to the currency required by the recipient, if necessary. The system may be further configured to focus on merchant credits or foreign exchange by the user's ECD and Summa associated software. Thus, the system may be configured to reject a transaction if, for example, the currency required by recipient does not match that specified by the sender. The system may also be configured to facilitate such a transaction by maintaining in the Summa affiliated server network a Fund/Credits Table similar to that shown below. The chart below identifies a type of credit, a currency, and attributes associated with each type of credit, such as whether it is transferable. A store credit, for example, might not be transferable to another user while currency would always be transferable to other users. Other conditions and restrictions may also be identified by merchants and stored in the table. The system may be configured to identify and dynamically change exchange rates, as necessary.

| Credit Type | Denomination Name and/or Merchant Credits ID | Transferable** | Exchange Rate (in dollars) (subject to change) | Merchant Rate (merchant credit in merchant denomination) (may not be needed) |
|---|---|---|---|---|
| Currency | US Dollarz | Yes | 1 | — |
| Currency | Yen | Yes | 116 | — |
| Currency | Euro | Yes | 0.93 | — |
| Credit | Company 1 | Yes | 1 | 1 |
| Credit | Company 2A | No | — | 1 |
| Credit | Company 2B | Yes | 0.01 | — |

The system may be configured to allow a merchant to create one or more merchant credits as may be defined in the Merchant Credits Table as shown below.

| Merchant ID | Merchant and/or Credits ID | Total Credits Issued | Total Credits Redeemed | Transferrable** | Currency Link | Monthly Fee | Expiration Date | Expiration Interval |
|---|---|---|---|---|---|---|---|---|
| Company 1 | C1 | 50,000 | 10,324 | Yes | $ | 0 | — | — |
| Company 2 | C2A | 10,203 | 3,452 | No | $ | 15.00 | Jun. 30, 1988 | — |
| Company 2 | C2B | 834,431 | 132,565 | No | $ | 15.00 | — | 365 days from issue |
| Company 3 | C3 | 0 | 0 | No | Yen | 12.00 | — | — |

The system may be further configured to allow merchant credits to be linked to the merchant's currency denomination to prevent currency fluctuation related to credits. For instance, this would facilitate calculations if buyer is using a combination of both yen based merchant credits plus US Dollars to purchase a product priced in Yen. The system may be further configured to associate the Merchant Credits with specific information about the credits, for instance, expiration dates. If the merchant chooses to allow a transfer of issued credits, this may be identified in the table, and the system would be configured to allow the holder of the credits to transfer them to the account of another Summa users. An example of where this might be useful is in donating airline "mileage points" to a charity.

The Summa server network may also be configured to track multiple accounts, automatically convert payments into a required currency, and to issue or apply store credits against a payment. The system may also be configured to associated with each user's account one or more data files containing a record of credits and currency held by each user. This data may be stored on Summa network associated servers and the system may be configured so that the user's ECD is enabled to retrieve and display the balances to the user. The table shown below is one example.

| User Funds/Credit Table | | |
|---|---|---|
| USER ID | Currency Type or Merchant Credits ID | Units |
| Doug12@qixit.com | US Dollars | 40.431 |
| Doug12@qixit.com | Euros | 8.35 |
| Doug12@qixit.com | Company1/C1 | 3.211 |
| Doug12@qixit.com | Company 2/C2A | 5 |
| Doug12@qixit.com | Company2/C2B | 15 |

Using this information, the system may be configured so that either the ECD and/or network servers check outgoing payments to see if the recipient has issued any credits to the user. The table format also allows the user to check credits table and elect to apply the credits to the payment. If credits had been issued, the system may be configured to see if the credits had expired. If not, and if there were no other conditions set by the merchant to preclude use of the credits for this transaction, the Summa affiliated network system may be configured to apply the merchant credits to the purchase and transfer the balance that might be required from the user's currency account. Both the recipient and the sender might then be notified of the amounts debited and credited to both their merchant credit and their currency accounts. The system may be further configured so that the Summa associated provider of this service might collect a fee for (1) total unredeemed credits being tracked, and (2) the standard merchant fee associated with the value of credits redeemed at the time of redemption.

The Summa system may also be configured to provide an escrow system for the purchase and/or selling of items by consumers over the web. By setting up a "Summa Escrow Service", a buyer could purchase an item from a seller, transferring credits to a Summa escrow account for holding until the item is received. The system may be configured to charge the parties a fee. The seller, upon being informed the buyer has agreed to the selling price and transferred funds, would ship the item to the buyer. Upon confirmed receipt, the funds would be transferred to the seller's account. For example, an individual may desire to sell a computer and advertise such on the internet, perhaps through a separate escrow system. Another individual may desire to purchase this computer, also through the same system. The system may be configured so that the purchaser, agreeing to buy the computer from the seller, transfers funds from his or her Summa account to the escrow account. These funds would represent the purchase amount plus a small fee for security and handling paid to the escrow service. Upon receipt of the funds the escrow account, the system may be configured so that the seller would be notified of the transfer by the escrow service, signaling that the product could be shipped to the purchaser. Upon receipt of the product, system may be configured so that the purchaser indicates receipt via the escrow system, which would then signal the seller of this fact and transfer the purchase amount to the seller's Summa account. The confirmation of delivery may also be automated by reference to tracking numbers used for the shipment retrieved from the shipping service's tracking network.

Figure 8:
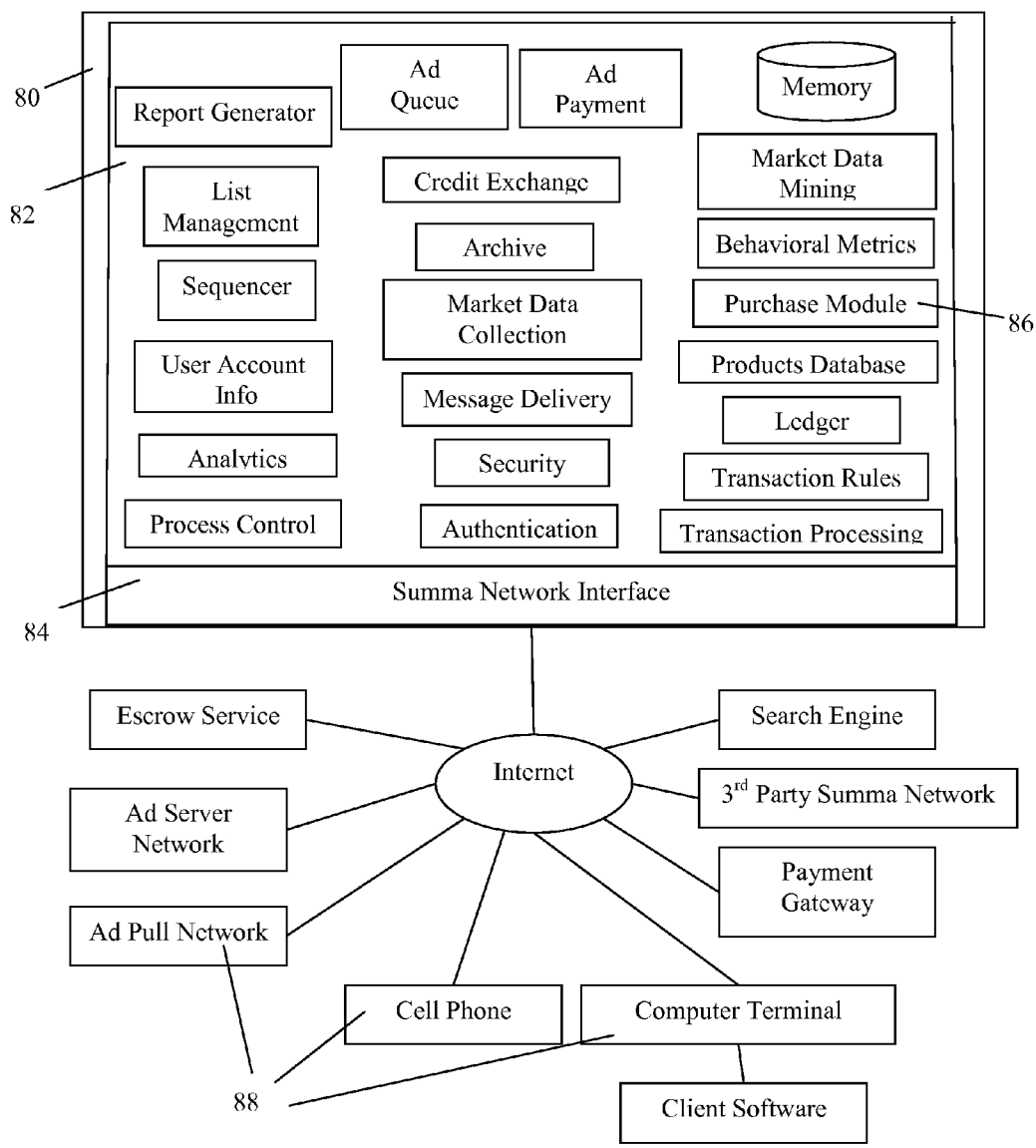
FIG. 8 is a schematic diagram providing an overview of an exemplary Summa system and its interface with the internet and third parties.

FIG. 8 shows a general schematic overview of the Summa system and how it may be interfaced with the internet and third party systems, including financial systems. Generally speaking, the Summa system may contain an interface to allow it function with the internet and allow Summa users who may be on the internet to access their Summa accounts as necessary to complete a transaction as described above. The Summa system may include a transaction processing module that processes a Summa transaction in the manner described herein with a transaction rules database and authentication module providing information to the transaction module in the manner described herein. A database storing Summa user account information also provides information vital to the transaction. A ledger module may process the Summa user's financial account information based upon transaction processing from the transaction processing module and resultant data may be stored in an account database. A module may be provided to process and track marketing data, and module may be provided to process and track behavioral analytics data. The marketing module and analytics module may be interconnected and use similar data. A behavioral metrics module, a credit exchange module and a merchant module may also be provided to perform the functions described herein.

As is apparent from FIG. 8, the Summa system may be integrated with many functions and enhanced capabilities through its interface with the Internet. A Summa system may comprise one or more Summa networks 80, wherein each Summa network consists of one or more Summa servers 82, and a Summa Server network interface 84 by which each Summa network 80 is connected with the internet and third parties. Each Summa server 82 is a computer running program modules, such as purchase module 86, wherein at least one module is a service available to at least one of many possible clients 88 communicating with a Summa network via the Internet. Third party server networks may be linked to the Summa system via the internet. Financial institutions, including payment gateways such as automated clearing houses may be linked to the Summa system via the internet. Escrow services, search engines, advertising servers may also be linked to the Summa system via the internet. A Summa user's cell phone or smart phone may be linked to the Summa system via the internet through a mobile switching center, for instance, as described in co-pending patent application entitled "System and Method for Transferring Funds to Recipients of Electronic Messages," application Ser. No. 12/261,764, filed Oct. 30, 2008. A personal computer may also be connected to the Summa system via the Internet, thereby allowing a Summa user to control receipt of messages, track links, manage micropayments, and other functions as described above.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed were meant to be illustrative only and not limited as to the scope of the invention which is to be given the full breadth of the appended claims and any and all equivalents thereof.

What is claimed is:

1. A method of processing electronic transactions between user accounts on a designated network, the method comprising:

providing a plurality of users each with a user account comprising an account identifier and a financial account, each user account being enabled to execute electronic transactions and receive electronic content;

providing a memory storing a database, the database comprising user account information;

providing at least one server, the server being in communication with the memory and with a plurality of electronic communication devices, via the designated network, each of the plurality of electronic communication devices being associated with a user;

receiving, from a first user via the designated network, data defining an electronic transaction, the data comprising a delivery data part and at least one designation of funds part comprising a payment amount to be transferred between the financial account associated with the first user and a financial account associated with a second user, the data further comprising delivery criteria defining one or more user accounts eligible to execute the electronic transaction;

storing the data in the database as data associated with the first user's account;

receiving from a second user via the designated network, a request to execute the electronic transaction;

comparing the second user's account information to the delivery criteria associated with the electronic transaction;

delivering the delivery data part of the electronic transaction to an electronic communications device associated with the second user in a manner to enable the second user's electronic communications device to process the delivery data and transferring at least a portion of the payment amount between the first user's financial account and the second user's financial account if and only if the second user's account information is compatible with the delivery criteria associated with the electronic transaction; and storing, in the database, data describing the second user's interaction with the electronic transaction.

2. The method of claim 1 wherein the request to execute the electronic transaction comprises a hyper-text transfer protocol request ("HTTP request") initiated by activation of a hyperlink associated with the electronic transaction.

3. The method of claim 2 wherein the delivery data part of the electronic transaction data further comprises a product identifier, wherein the hyperlink comprises the product identifier, and wherein the server is further configured to (1) receive, upon activation of the hyperlink, the hyperlink product identifier, and (2) query the database to find the associated electronic transaction data for the received hyperlink product identifier.

4. The method of claim 3 wherein the hyperlink comprises a payment amount notice and wherein the server is further configured to (1) receive the hyperlink payment amount notice upon activation of the hyperlink, (2) compare the hyperlink payment amount notice to the stored payment amount for the electronic transaction, and (3) process the request by one of two disposition modes, the first mode comprising notifying the second user of an error if the hyperlink payment amount does not match the stored payment amount for the electronic transaction, and the second mode comprising executing the electronic transaction if the hyperlink payment amount matches the stored payment amount for the electronic transaction.

5. The method of claim 4 wherein the designation of funds comprises a payment amount to be transferred from the first user's financial account to the second user's financial account, and wherein the second user's electronic communication device is configured to read the payment amount from the hyperlink and display the payment amount as a payment that will be paid to the second user upon activating the hyperlink.

6. The method of claim 5 wherein the stored electronic transaction data comprises a condition that the second user must satisfy before the electronic transaction will be executed, and wherein the server is configured not to execute the electronic transaction until the condition is satisfied.

7. The method of claim 6 wherein the electronic transaction data comprises a period of time, and wherein the condition comprises viewing an advertisement for the period of time.

8. The method of claim 3 wherein the designation of funds comprises a payment amount to be transferred from the second user's financial account to the first user's financial account and wherein the second user's electronic communication device is configured to display the payment amount as a price that will be paid from the second user's financial account upon activating the hyperlink.

9. The method of claim 8 wherein the second user's computer is configured to require a confirmation if the price is above a predetermined threshold.

10. The method of claim 8 wherein the delivery data part comprises a purchase receipt.

11. The method of claim 8 wherein the delivery data part comprises access information that is necessary for accessing electronic content provided by the first user.

12. The method of claim 11 wherein the access information comprises a password.

13. The method of claim 8 wherein the electronic transaction data comprises an indication that a one-time code is required, and wherein the server is further configured to (1) generate a one-time code (2) insert the one-time code into the delivery data part of the electronic transaction, and (3) electronically deliver the one-time code to the first user in real-time.

14. The method of claim 8 wherein the electronic transaction data comprises an indication that a one-time code is required, and wherein the server is further configured to (1) generate a message to the first user comprising a notification that the hyperlink has been activated, (2) receive a one-time code from the first user, and (3) insert the one-time code into the delivery data part of the electronic transaction.

15. The method of claim 1 wherein the server is further configured to (1) receive at least one variable associated with the request to execute the electronic transaction, and (2) insert the at least one variable into the delivery data part of the electronic transaction.

16. The method of claim 8 wherein the electronic transaction data comprises a pre-defined percentage of revenue to be shared with an affiliate user account, and wherein the server is further configured to (1) identify an affiliate based on the received request to execute the electronic transaction, and (2) deliver the pre-defined percentage of the payment amount to the affiliate user's financial account.

17. The method of claim 16 wherein the server is configured to identify an affiliate based on hyper-text transfer protocol referrer header information received in the HTTP request.

18. A system for processing electronic transactions between user accounts on a designated network, the system comprising:
 a memory storing a database;
 a server in communication with the memory and further in communication with a plurality of electronic communication devices via the designated network, the server being configured to:
 (1) provide a plurality of users each with a user account comprising an account identifier and a financial account, each user account being enabled to execute electronic transactions and receive electronic content,
 (2) receive, from a first user via the designated network, data defining an electronic transaction, the data comprising a delivery data part and a designation of funds part comprising a payment amount to be transferred between the financial account associated with the first user and a financial account associated with a second user, and the data further comprising delivery criteria defining one or more user accounts eligible to execute the electronic transaction,
 (3) store the data in the database as data associated with the first user's account;
 (4) receive, from a second user via the designated network, a request to execute the electronic transaction,
 (5) compare the second user's account information to the delivery criteria associated with the electronic transaction,
 (6) deliver the delivery data part to an electronic communications device associated with the second user in a manner to enable the second user's electronic communications device to process the delivery data, and transfer at least a portion of the payment amount between the first user's financial account and the second user's financial account if and only if the second user's account information is compatible with the delivery criteria associated with the electronic transaction, and
 (7) store, in the database, data describing the second user's interaction with the electronic transaction.

19. The system of claim 18 wherein the request to execute the electronic transaction comprises a hyper-text transfer protocol ("HTTP request") initiated by activation of a hyperlink associated with the electronic transaction.

20. The system of claim 19 wherein the data defining the electronic transaction further comprises a product identifier, and wherein the hyperlink comprises the product identifier, and wherein the server is further configured to (1) receive, upon activation of the hyperlink, the hyperlink product identifier, and (2) query the database to find the associated electronic transaction data for the received hyperlink product identifier.

21. The system of claim 20 wherein the hyperlink comprises a payment amount notice and wherein the server is further configured to (1) receive the hyperlink payment amount notice upon activation of the hyperlink, (2) compare the hyperlink payment amount to the stored payment amount notice for the electronic transaction, and (3) process the request by one of two disposition modes, the first mode comprising notifying the second user of an error if the hyperlink payment amount does not match the stored payment amount for the electronic transaction, and the second mode comprising executing the electronic transaction if the hyperlink payment amount matches the stored payment amount for the electronic transaction.

22. The system of claim 21 wherein the designation of funds comprises a payment amount to be transferred from the first user's financial account to the second user's financial account, and wherein the second user's electronic communication device is configured to read the payment amount from the hyperlink and display the payment amount as a payment that will be paid to the second user upon activating the hyperlink.

23. The system of claim 22 wherein the stored electronic transaction data comprises a condition that the second user must satisfy before the electronic transaction will be executed, and wherein the server is configured not to execute the electronic transaction until the condition is satisfied.

24. The system of claim 23 wherein the electronic transaction data comprises a period of time, and wherein the condition comprises viewing an advertisement for the period of time.

25. The system of claim 20 wherein the designation of funds comprises a payment amount to be transferred from the second user's financial account to the first user's financial account and wherein the second user's electronic communication device is configured to display the payment amount as a price that will be paid from the second user's financial account upon activating the hyperlink.

26. The system of claim 25 wherein the second user's electronic communication device is configured to require a confirmation if the price is above a predetermined threshold.

27. The system of claim 25 wherein the delivery data part of the stored electronic transaction data comprises a purchase receipt.

28. The system of claim 25 wherein the delivery data part of the stored electronic transaction data comprises access information that is necessary for accessing electronic content.

29. The system of claim 28 wherein the access information comprises a password.

30. The system of claim 25 wherein the electronic transaction data comprises an indication that a one-time code is required, and wherein the server is further configured to (1) generate a one-time code (2) insert the one-time code into the delivery data delivered to the second user's electronic communications device, and (3) electronically deliver the one-time code to the first user in real-time.

31. The system of claim 25 wherein the electronic transaction data comprises an indication that a one-time code is required, and wherein the server is further configured to (1) generate a message to the first user comprising a notification that the hyperlink has been activated, (2) receive a one-time code from the first user, and (3) insert the one-time code into the delivery data part of the electronic transaction.

32. The system of claim 25 wherein the server is further configured to (1) receive at least one variable with the request to execute the electronic transaction, and (2) insert the at least one variable into the delivery data part of the electronic transaction.

33. The system of claim 25 wherein the electronic transaction data comprises a pre-defined percentage of revenue to be shared with an affiliate user account, and wherein the server is further configured to (1) identify an affiliate based on the received request to execute the electronic transaction, and (2) deliver the pre-defined percentage of the payment amount to the affiliate user's financial account.

34. The system of claim 33 wherein the server is configured to identify an affiliate based on hyper-text transfer protocol referrer header information received in the HTTP request.

* * * * *